(12) United States Patent
Saller

(10) Patent No.: US 7,260,084 B2
(45) Date of Patent: Aug. 21, 2007

(54) METHOD FOR ESTABLISHING A CONNECTION FROM A TERMINAL OF A COMMUNICATION NETWORK TO A NETWORK-EXTERNAL CONNECTION DESTINATION, AND ASSOCIATED APPARATUS AND NETWORK

(75) Inventor: Franz Saller, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 679 days.

(21) Appl. No.: 09/966,853

(22) Filed: Sep. 28, 2001

(65) Prior Publication Data

US 2003/0031166 A1 Feb. 13, 2003

(30) Foreign Application Priority Data

Sep. 29, 2000 (DE) ................... 100 48 483

(51) Int. Cl.
*H04L 12/66* (2006.01)
(52) U.S. Cl. ............... 370/352; 370/401; 370/392
(58) Field of Classification Search ........... 370/352, 370/353, 354, 355, 356, 389, 392, 401
See application file for complete search history.

(56) References Cited

U.S. PATENT DOCUMENTS

| | | | | |
|---|---|---|---|---|
| 6,298,062 B1* | 10/2001 | Gardell et al. | ............... | 370/401 |
| 6,363,065 B1* | 3/2002 | Thornton et al. | ........... | 370/352 |
| 6,366,576 B1* | 4/2002 | Haga | ........................ | 370/352 |
| 6,757,275 B2* | 6/2004 | Sorrentino | ................... | 370/352 |
| 6,772,210 B1* | 8/2004 | Edholm | ...................... | 709/226 |
| 6,798,745 B1* | 9/2004 | Feinberg | ..................... | 370/235 |
| 2001/0026545 A1* | 10/2001 | Matsumoto et al. | ........ | 370/338 |
| 2002/0041588 A1* | 4/2002 | Gleneck | ...................... | 370/352 |
| 2002/0159440 A1* | 10/2002 | Mussman et al. | ........... | 370/352 |

FOREIGN PATENT DOCUMENTS

| | | |
|---|---|---|
| DE | 19948458 | 4/2001 |
| WO | WO9859467 | 12/1998 |
| WO | WO0079744 | 12/2000 |

OTHER PUBLICATIONS

ATM Forum, "Gateway for H.323 Media Transport Over ATM, AF-SAA-0124.000", The ATM Forum, Technical Committee, Jul. 1999, Found online on Nov. 12, 2003 at URL.

(Continued)

*Primary Examiner*—Chau Nguyen
*Assistant Examiner*—Christine Ng
(74) *Attorney, Agent, or Firm*—Bell, Boyd & Lloyd LLP

(57) ABSTRACT

A method for establishing a connection from a network-internal terminal of a communication network, the network-internal connections of which are managed by a connection controller, to a network-external connection destination, wherein the connection is established via a gateway device which is registered in the connection controller under the logical address of the network-external connection destination, and on the basis of the logical destination address, the connection controller establishes a network-internal connection from the terminal to the gateway device, and in the gateway device itself, a network-externally valid transport address is assigned to the logical destination address, on the basis of which transport address the connection is relayed to the network-external connection destination.

9 Claims, 1 Drawing Sheet

OTHER PUBLICATIONS

ETSI: "Telecommunications and Internet Protocol Harmonization Over Networks (TIPHON); Signaling for basic calls and inter domain calls, between an H.323 Terminal and a Terminal in a Switched Circuit Network (SCN) Phase II: Scenario 2", ETSI TS 101 322 V1.0.0 Jul. 1999.

ITU-T H.323 Series H—Audiovisual and Multimedia Systems—Packet-based multimedia communications systems, Feb. 1998.

* cited by examiner

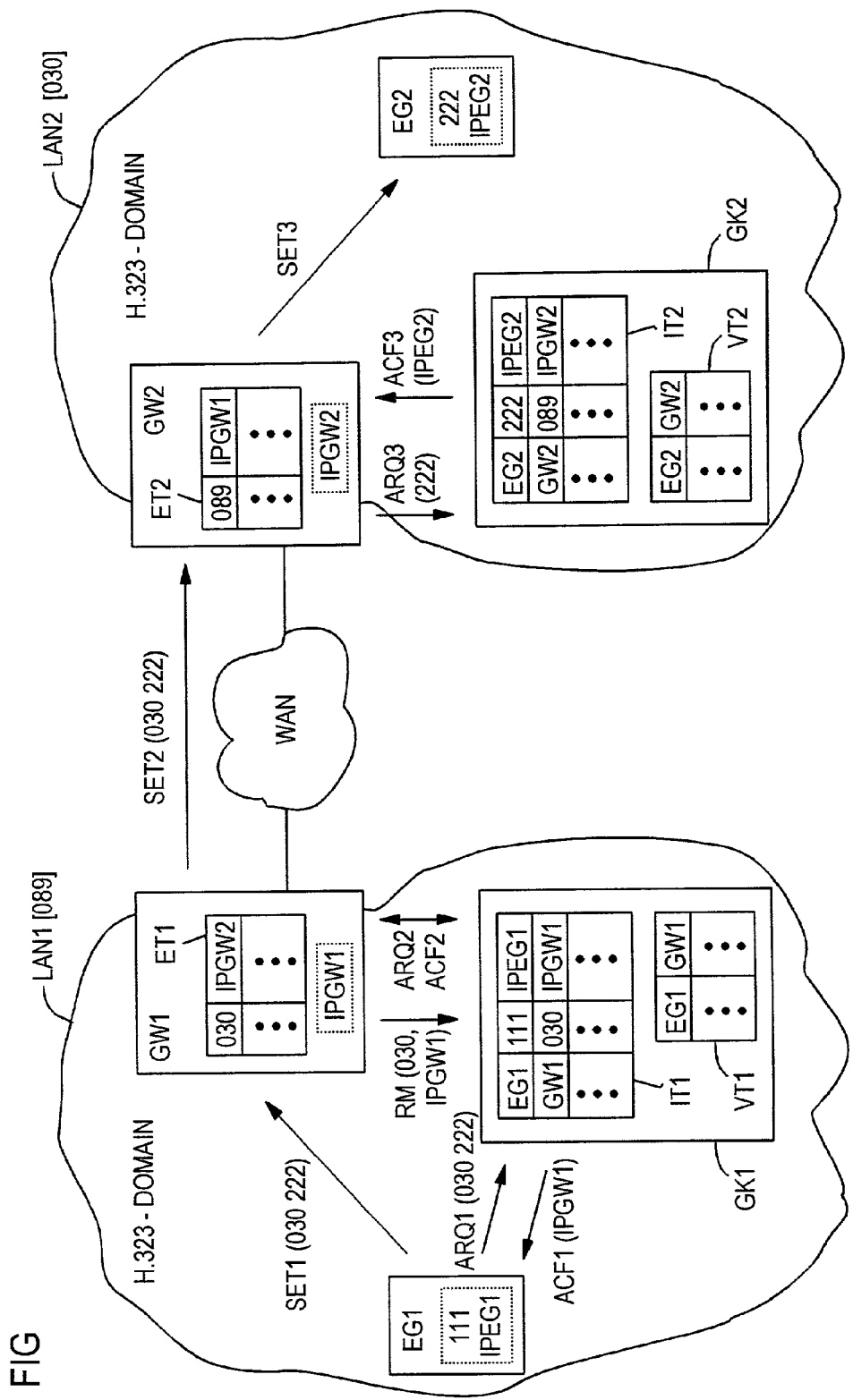

METHOD FOR ESTABLISHING A CONNECTION FROM A TERMINAL OF A COMMUNICATION NETWORK TO A NETWORK-EXTERNAL CONNECTION DESTINATION, AND ASSOCIATED APPARATUS AND NETWORK

BACKGROUND OF THE INVENTION

In modern communication systems, connections such as for voice, video or multimedia communication are increasingly being carried over packet-based communication networks, such as local area networks (LAN) or wide area networks (WAN) So-called Internet telephony, for example, often also referred to as "Voice over Internet Protocol" (VoIP), is based on this technology.

In such packet-based communication networks, the user data to be transmitted is split into individual data packets which are provided with a transport address that identifies the respective connection destination. On the basis of the transport address the data packets are forwarded in the communication network to the respective connection destination independently of each other to a large extent.

A central connection controller is often employed in packet-based communication networks. As a rule, such a connection controller manages the establishment and clearing of connections, ensures a defined quality of service for establishment connections, protects against unauthorized use, and enables the use of features such as call forwarding or proxy functionality, for example.

Known from ITU-T Recommendation H.323 is a packet-based communication network in which a so-called gatekeeper is used as a connection controller for controlling and managing all real-time multimedia connections within the communication network or a subnetwork of the communication network. According to the prior at, in order to establish a connection from a first communication network managed by a first gatekeeper in a second communication system managed by a second gatekeeper, signaling is required between the first and the second gatekeeper. However, such signaling between different gatekeepers requires a high implementation effort, especially if there are also one or more further packet-based communication networks between the first and second communication networks. Typical examples of such an arrangement are local area networks located at various company offices which are linked together via the Internet.

Another disadvantage of the known gatekeeper-controlled communication network is that from the first communication network it is only possible to establish connections to communication networks also managed by a gatekeeper. The choice of connection destination is thus greatly limited.

An object of the present invention is, therefore, to disclose a method for establishing a connection from a network-internal terminal of a packet-based communication network having a network-internal connection controller to a network-external connection destination for which no complex signaling is required between the network-internal and a network-external connection controller. It is also an object of the present invention to disclose a packet-based communication network and a gateway device for achieving the method according to the present invention.

SUMMARY OF THE INVENTION

The present invention enables a connection, for example for voice, video or multimedia communication, to be established from a network-internal terminal of a packet-based communication network, the network-internal connections of which are managed by a connection controller, to a network-external connection destination. The connection establishment is performed here via a gateway device of the communication network. The network-external connection destination may be, for example, another terminal, another communication network or subnetwork, or another gateway device to a further communication network. In this context, the terms "network-internal" and "network-external" refer to the area inside and outside the packet-based communication network, respectively.

One major advantage of the present invention is that no additional signaling is required between central connection controllers of different communication networks in order to establish a connection. It is, therefore, also unnecessary for the connection controller to have any complex interface to network-external connection controllers. It is nevertheless possible to utilize the full range of data packet transport capabilities of a communication network relaying the connection to the connection destination. It is, moreover, also possible to establish connections to connection destinations that are not controlled by any connection controller.

According to one advantageous embodiment of the method according to the present invention, the gateway device can register as a network-internal connection destination with the connection controller under one or more logical addresses that identify one or more network-external connection destinations. An address table for network-internal connection destinations of the connection controller can, thus, be automatically updated. As a result, only administration of the gateway device is necessary to manage a number of different network-external connection destinations.

Furthermore, the logical address information, which may include a prefix number, service number and/or a terminal directory number, for example, can be transmitted to the network-external connection destination over the relaying communication network. If the connection destination is another communication network, the connection can be relayed to the further communication network on the basis of the logical address information, or a part thereof, to a thereby addressed destination terminal of the further communication network.

According to another advantageous embodiment of the present invention, the central connection controller can be achieved by a gatekeeper conforming to ITU Recommendation H.323.

The gateway device also can have an access control device in order to reject any connection requests arriving from the relaying communication network whose respective origin is not registered as a network-external connection destination in the gateway device. Accordingly, the network-external connection destinations that are registered in the gateway device can be assumed to be reliable connection partners, from which an arriving connection request will be accepted.

Additional features and advantages of the present invention are described in, and will be apparent from, the following Detailed Description of the Invention and the Figures.

BRIEF DESCRIPTION OF THE FIGURES

FIG. 1 shows a diagrammatic representation of two communication networks linked via a wide area network during the establishment of a connection.

DETAILED DESCRIPTION OF THE INVENTION

Diagrammatically illustrated in FIG. 1 are two communication networks LAN1 and LAN2 designed as local area networks which are linked via a wide area network WAN; e.g., the Internet.

The local area networks LAN1 and LAN2 and the wide area network WAN support packet-based data transport in each case. In the present exemplary embodiment, the data packet transmission in the local area networks LAN1 and LAN2 and in the wide area network WAN is based, in each case, on the so-called Internet Protocol (IP), with which data packets are forwarded through the respective communication network LAN1, LAN2 or WAN on the basis of an IP transport address contained therein.

It is assumed for the present exemplary embodiment that the local area network LAN1 is located in the Munich telephone code area having the public prefix number 089 and the local area network LAN2 is located in the Berlin telephone code area having the public prefix number 030. Accordingly, the prefix number 089 is logically assigned to the local area network LAN1 and the prefix number 030 is logically assigned to the local area network LAN2.

The local area networks LAN1 and LAN2 form, in each case, so-called H.323 domains conforming to ITU-T Recommendation H.323. In accordance with the H.323 Recommendation, a so-called gatekeeper GK1 or GK2 is respectively provided as a connection controller in each of the local area networks LAN1 and LAN2. The gatekeepers GK1 and GK2 are responsible in each case for controlling and managing all the connections to be established within the respective H.323 domains LAN1 and LAN2. In particular, the gatekeepers GK1 and GK2 serve as access controllers in their respective H.323 domains, as well as to resolve the logical address information in IP transport addresses for all the terminals and gateway devices in the respective H.323 domains. In the present exemplary embodiment the gatekeepers GK1 and GK2 manage only communication devices situated within their own H.323 domains LAN1 and LAN2, respectively.

Each gatekeeper GK1 and GK2 has an address table IT1 and IT2, respectively, and a connection table VT1 and VT2, respectively, for network-internal connections; that is, connections within the respective local area network LAN1 and LAN2. In each case, the endpoints of network-internal connections are entered and assigned to each other in the connection tables VT1 and VT2. In the address tables IT1 and IT2, logical address information and a network-internal transport address are assigned to the communication devices managed by the respective gatekeeper GK1 or GK2.

Furthermore, the local area networks LAN1 and LAN2 each have a gateway device GW1 and GW2, respectively, via which the respective local area network LAN1 or LAN2 is connected to the wide area network WAN.

In the present exemplary embodiment, an IP address IPGW1 and IPGW2 is assigned, in each case, to the gateway devices GW1 and GW2 respectively, via which address the respective gateway device GW1, GW2 can be reached by data packets originating both in its own local area network LAN1 or LAN2 and in the wide area network WAN. According to an alternative embodiment, it is possible to provide for at least one of the gateway devices GW1 and GW2 to be addressed in its own local area network LAN1 or LAN2 by a different IP address than in the wide area network WAN.

The gateway devices GW1 and GW2 have, in each case, an address table ET1 and ET2, respectively, for network-external connections; that is to say for connections outside the respective local area networks LAN1 and LAN2. In the address tables ET1 and ET2, logical address information that identifies network-external connection destinations is assigned to a network-external transport address; that is to say an address valid in the wide area network WAN.

In the present exemplary embodiment, in the address table ET1 of the gateway device GW1, the IP address IPGW2 of the gateway device GW2 is assigned to the prefix number 030 which identifies as logical address information the local area network LAN2 or the gateway device GW2. Analogously, the IP address IPGW1 of the gateway device GW1 is assigned in the address table ET2 to the prefix number 089 that identifies the local area network LAN1.

Each local area network LAN1, LAN2 furthermore contains a terminal EG1 and EG2, respectively. Assigned to the terminal EG1 is a terminal directory number 111 as logical address information and an IP address IPEG1 as a network-internally valid transport address. Analogously, assigned to the terminal EG2 is a terminal directory number 222 as logical address information and an IP address IPEG2 as a transport address valid in the local area network LAN2. The terminal EG1 is assigned to its terminal directory number 111 and to its IP address IPEG1 in the address table IT1 of the gatekeeper GK1. Analogously, the terminal EG2 is assigned to its terminal directory number 222 and to its IP address IPEG2 in the address table IT2 of the gatekeeper GK2. The terminals EG1 and EG2 may be achieved, for example, by voice, video and/or multimedia terminals; in particular, by personal computers.

The gateway devices GW1 and GW2 preferably register, for example after a change in the respective address table ET1 or ET2 or following a system startup, with the respective gatekeeper GK1 or GK2 as a network-internal connection destination under the respective network-external prefix number 030 or 089. The gateway device GW1, for example, transmits for this purpose a registration message RM with the prefix number 030 of the telephone code area of the local area network LAN2 as well as its own IP address IPGW1 to the gatekeeper GK1. As a result, the gatekeeper GK1 assigns to the gateway device GW1 the prefix number 030 as logical address information and the IP address IPGW1 as the network-internal transport address. The gatekeeper GK1 treats the prefix number 030 as network-internally valid logical address information of the gateway device GW1. If a number of external communication networks are registered in the gateway device GW1 under a respective prefix number, a number of prefix numbers are accordingly assigned as network-internal logical address information to the gateway device GW1 in the address table IT2.

Analogously, one or more registration messages (not shown) are transmitted to the gatekeeper GK2 by the gateway device GW2. As a result, assigned to the gateway device GW2 in the address table IT2 are the IP address IPGW2 as network-internal transport address and the prefix number 089, and further prefix numbers, if appropriate, as network-internal logical address information.

The establishment of a connection from the terminal EG1 of the local area network LAN1 to the terminal EG2 of the local area network LAN2 will now be considered. The connection establishment is initiated at the terminal EG1 by entering the prefix number 030, which identifies the telephone code area of the destination network LAN2, and the terminal directory number 222. The prefix number 030 represents here the logical address information with respect to the destination network LAN2, or its gateway device GW2 respectively. Analogously, the terminal directory number 222 represents the logical address information with respect to the destination terminal EG2 within the destination network LAN2.

As part of a connection request, the terminal EG1 sends an admission request message (ARQ1) with the entered prefix number 030 and the entered terminal directory number 222 to the gatekeeper GK1. The gatekeeper GK1 then searches in its address table IT1 for logical address information that matches at least the first part of the transmitted logical address information 030 222. In the present exemplary embodiment, the logical address information under which the gateway device GW1 is registered with the gatekeeper GK1 matches the transmitted prefix number 030. The gateway device GW1 is, thus, determined by the gatekeeper GK1 as the connection destination. As a result, the gatekeeper GK1 transmits an admission confirmation message ACF1 with the IP address IPGW1 assigned to the gateway device GW1 in the address table IT1 to the terminal EG1.

According to alternative embodiments of the connection establishment, instead of the prefix number 030 and the terminal directory number 222, for example, an alias address, email address or URL (Uniform Resource Locator) that identifies the terminal EG2 may be transmitted as logical address information to the gatekeeper GK1 by the terminal EG1. If an IP transport address is assigned to such logical address information in the address table IT1, the IP transport address is transmitted to the terminal EG1 in the admission confirmation message ACF1.

On the basis of the transmitted IP address IPGW1, the terminal EG1 transmits a connection setup message SET1 conforming to the H.323 Recommendation with the prefix number 030 and terminal directory number 222 to the gateway device GW1. The gateway device GW1 then transmits an admission request message ARQ2 to the gatekeeper GK1, and following reception of an admission confirmation message ACF2 accepts the connection requested by the terminal EG1 in accordance with the H.323 Recommendation.

The network-internal connection between the terminal EG1 and the gateway device GW1 is registered in the connection table VT1 of the gatekeeper GK1. The terminal EG1 and the gateway device GW1 are assigned to each other here in the connection table VT1.

The prefix number 030 transmitted by the terminal EG1 is assigned in the address table ET1 of the gateway device GW1 to a network-external transport address IPGW2. The gateway device GW1 thus recognizes that the connection is to be relayed over the wide area network WAN. Since, owing to its limited responsibility, the gatekeeper GK1 cannot control the relaying of the connection, and the gatekeeper GK1 would not accept connections whose destination address information it cannot resolve itself, the gateway device GW1 does not transmit an admission request message to the gatekeeper GK1 for the relaying of the connection. The gateway device GW1 thus "hides" the relaying of the connection from the gatekeeper GK1.

To relay the connection, the gateway device GW1 determines the IP address IPGW2 assigned to the prefix number 030 in the address table ET1, via which address the gateway device GW2 is addressed in the wide area network WAN. With respect to the prefix number 030, the gateway device GW2 thus serves as the connection destination. Based on the IP address IPGW2, a connection setup message SET2 conforming to the H.323 Recommendation with the prefix number 030 and the terminal directory number 222 is transmitted by the gateway device GW1 to the gateway device GW2. The gateway device GW2 recognizes that the sender IP address IPGW1 of the data packets transporting the connection setup message SET2 is contained in the address table ET2 and consequently accepts the connection. The gateway device GW1 is thus accepted by the gateway device GW2 as a so-called "trusted gateway". Since the connection is arriving from an external communication network (WAN), the connection is accepted without checking back with the gatekeeper GK2.

The gateway devices GW1 and GW2 are, thus, operated in the direction toward the wide area network WAN in a non-gatekeeper H.323 mode, and simultaneously in the direction toward the respective local area network LAN1, LAN2 in a gatekeeper-controlled H.323 mode.

The gateway device GW2 removes the prefix number 030 from the transmitted logical address information 030 222 and transmits an admission request message ARQ3 with the remaining terminal directory number 222 to the gatekeeper GK2. The gatekeeper GK2 interprets this as a request for a connection from the gateway device GW2 to a terminal identified by the logical address information 222. On the basis of the address table IT2, the gatekeeper GK2 determines that the terminal EG2 with the IP address IPEG2 is assigned to the logical address information 222. The gatekeeper GK2 consequently transmits an admission confirmation message ACF3 with the IP address IPEG2 of the terminal EG2 to the gateway device GW2. On the basis of the transmitted IP address IPGW2, the gateway device GW2 sends a connection setup message SET3 conforming to the H.323 Recommendation to the terminal EG2, with the result that a network-internal connection establishment is initiated between the gateway device GW2 and the terminal EG2. The established network-internal connection is registered in the connection table VT2 of the gatekeeper GK2. The terminal EG2 and the gateway device GW2 are thereby stored assigned to each other in the connection table VT2. Finally, the connection coming from the terminal EG1 is switched through to the terminal EG2 over the network-internal connection established between the gateway device GW2 and the terminal EG2.

A connection is established in this manner between terminals EG1 and EG2 of different H.323 domains LAN1 and LAN2 which are linked via a wide area network WAN without the need for signaling between the responsible gatekeepers GK1 and GK2.

The present invention requires no modification to the terminals to be connected, so that any terminals conforming to the H.323 Recommendation can establish a cross-domain H.323 connection using the Internet Protocol as the transport layer. Logical address information, such as prefix numbers and terminal directory numbers, which belong to a different communication layer than the IP transport addresses used, are used here as access information to gateway devices of network-external H.323 domains.

One major advantage of the present invention is that no terminals of external H.323 domains need be administered in a gatekeeper GK1, GK2. Rather, the administration of external domains is limited to entering the logical address information 030, 089 and the transport addresses IPGW2, IPGW1 for the gateway devices GW2, GW1 of the external domains in the address table ET1, ET2 of the respective network-internal gateway device GW1 or GW2.

Although the present invention has been described with reference to specific embodiments, those of skill in the art will recognize the changes may be made thereto without departing from the spirit and scope of the invention as set forth in the hereafter appended claims.

The invention claimed is:

1. A method for establishing a connection from a network-internal terminal of a packet-based communication network to a network-external connection destination, the method comprising the steps of:
   transmitting, via the terminal, logical address information that identifies the network-external connection destination to a central connection controller provided for controlling and managing network-internal connections;
   determining, via the connection controller, a gateway device of the communication network as a connection destination based on the transmitted logical address information;
   establishing a connection controlled by the connection controller between the terminal and the gateway device;
   transmitting, via the terminal, the logical address information to the gateway device;
   determining, via the gateway device, a network-externally valid transport address which is assigned to the transmitted logical address information;
   addressing, via the gateway device, the network-external connection by the network-externally valid transport address in a relaying, packet-based communication network; and
   relaying the connection over the relaying communication network to the external connection destination based on the network-externally valid transport address,
   wherein the gateway device simulates to the connection controller that it is the destination and hides the relying of the connection from the connection controller.

2. A method for establishing a connection from a network-internal terminal of a packet-based communication network to a network-external connection destination as claimed in claim 1, the method further comprising the steps of:
   transmitting to the terminal, via the connection controller, a network-internally valid transport address which is assigned to the transmitted logical address information and addresses the gateway device; and
   initiating the connection to the gateway device, via the terminal, based on the network-internally valid transport address.

3. A method for establishing a connection from a network-internal terminal of a packet-based communication network to a network-external connection destination as claimed in claim 1, the method further comprising the step of:
   registering the gateway device as a network-internal connection destination with the connection controller under the logical address information that identifies the network-external connection destination.

4. A method for establishing a connection from a network-internal terminal of a packet-based communication network to a network-external connection destination as claimed in claim 1, the method further comprising the step of:
   transmitting the logical address information to the network-external connection destination over the relaying communication network.

5. A packet-based communication network, comprising:
   a central connection controller for controlling and managing network-internal connections and for converting logical address information that identifies network-internal connection destinations into network-internally valid transport addresses for transporting data packets within the communication network; and
   a gateway device connected to a relaying communication network for converting logical address information that identifies network-external connection destinations into network-externally valid transport addresses for transporting data packets over the relaying communication network,
   wherein the gateway device is registered in the connection controller as a network-internal connection destination under logical address information that identifies a network-external connection destination, and the external connection destination in the gateway device is registered as a network-external connection destination under the logical address information, which simulates to the connection controller that the gateway device is the destination and hides the relying of the connection from the connection controller.

6. A packet-based communication network as claimed in claim 5, wherein the central connection controller is a gatekeeper conforming to ITU-T Recommendation H.323.

7. A packet-based communication network as claimed in claim 5, wherein the logical address information further comprises at least one of a prefix number, service number and a terminal directory number.

8. A packet-based communication network as claimed in claim 5, wherein at least one of the network-internally valid transport address and the network-externally valid transport address are based on the Internet Protocol.

9. A packet-based communication network as claimed in claim 5, wherein the gateway device further comprises an access control device for rejecting connection requests arriving from the relaying communication network whose respective origin is not registered as a network-external connection destination in the gateway device.

* * * * *